United States Patent
Champagnon et al.

(10) Patent No.: US 6,328,175 B2
(45) Date of Patent: *Dec. 11, 2001

(54) MOULD FOR PRODUCING BOTTLE CAPS WITH TUCKED-IN TABS, AND RESULTING CAP

(75) Inventors: Pascal Champagnon, Saint-Jean-d'Ardieres; Claude Benoit-Gonin, Odenas, both of (FR)

(73) Assignee: Astra Plastique, Societe Anonyme, St. Georges de Reneins (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,432

(22) PCT Filed: Jan. 22, 1997

(86) PCT No.: PCT/FR97/00126

§ 371 Date: Jul. 9, 1998

§ 102(e) Date: Jul. 9, 1998

(87) PCT Pub. No.: WO97/27037

PCT Pub. Date: Jul. 31, 1997

(30) Foreign Application Priority Data

Jan. 26, 1996 (FR) .................................................. 96 01189

(51) Int. Cl.[7] .................................................. B65D 39/00
(52) U.S. Cl. .................................................. 215/252
(58) Field of Search .................................................. 215/252

(56) References Cited

U.S. PATENT DOCUMENTS

| 3,737,064 | * | 6/1973 | Patel et al. | 215/252 |
| 4,529,096 |  | 7/1985 | Chartier et al. . |  |
| 4,697,714 |  | 10/1987 | Towns et al. . |  |
| 5,178,888 |  | 1/1993 | Würl . |  |
| 5,281,385 |  | 1/1994 | Julian . |  |
| 5,450,973 | * | 9/1995 | Ellis et al. | 215/252 |
| 5,657,889 | * | 8/1997 | Guglielmini | 215/252 |
| 5,803,281 | * | 9/1998 | Towns | 215/44 |
| 5,913,436 | * | 6/1999 | Breuer | 215/252 |
| 5,941,403 | * | 8/1999 | Towns | 215/252 |

FOREIGN PATENT DOCUMENTS

| 37529 | 3/1991 | (CL) . |
| 0 125 097 A2 | 11/1984 | (EP) . |
| 2525565 | 10/1983 | (FR) . |
| WO 94/18085 | 8/1994 | (WO) . |

* cited by examiner

*Primary Examiner*—Stephen K. Cronin
(74) *Attorney, Agent, or Firm*—Oliff & Berridge, PLC

(57) ABSTRACT

This mold is intended to form a cap (1) having a cylindrical skirt (3), this skirt being provided with at least one screw thread (4), a top (2) and a tamperproof ring (6) linked to the free end of the skirt by breakable linking elements. It has a movable pat or mold top (20), a stripping part or stripper ring (21) and a core (22.

The stripper ring (21) has, on the side facing the top of the mold (20, on the lower edge of the skirt and in at least two separate places, at least one notch and/or at least one projection so as to create a mortise-and-tenon linkage between the skirt (3) and the stripper ring (21) during molding and demolding of the cap(1).

22 Claims, 4 Drawing Sheets

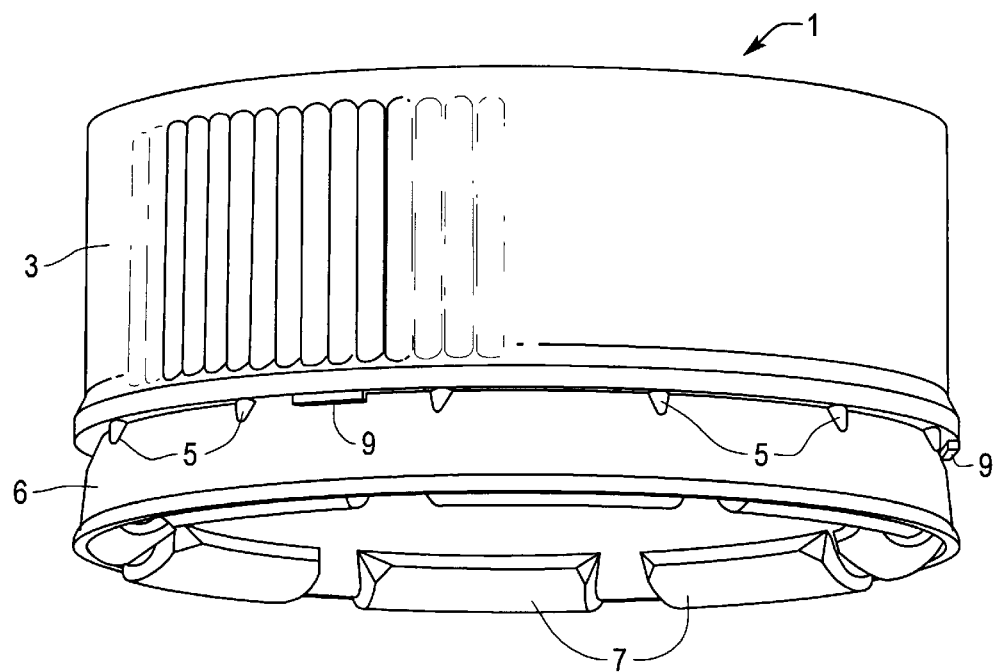
FIG 8
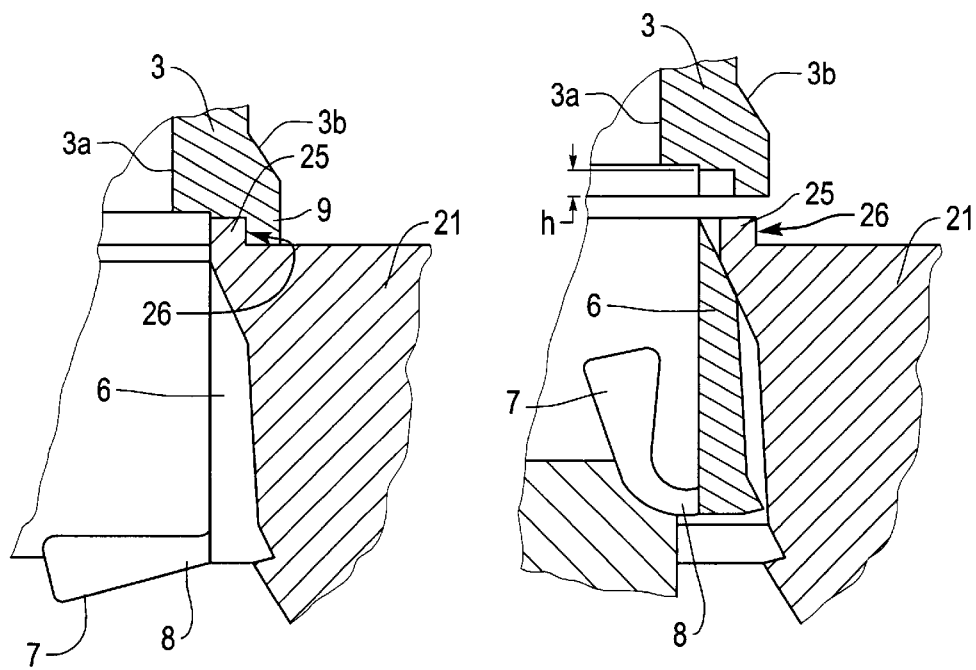
FIG 6
FIG 7

MOULD FOR PRODUCING BOTTLE CAPS WITH TUCKED-IN TABS, AND RESULTING CAP

The subject of the present invention is a mould for the production of tamperproof caps having tabs turned up in the mould, as well as a cap formed in such a mould.

One solution for making a screw cap, having a top and a threaded skirt, tamperproof is to provide the threaded skirt, on its free edge opposite the top of the cap, with a tamperproof ring. The latter includes tabs turned up towards the top of the cap and interacting with an annular rib made on a bottle intended to receive the cap. The tamperproof ring is linked to the skirt by breakable linking elements. Thus, on first opening the bottle, when the cap is unscrewed for the first time, the tabs come into abutment against the annular rib on the bottle, thus making is impossible to follow the cap in its translational movement. The breakable linking elements are then broken. This irreversible breaking makes it possible to see that the bottle has already been opened at least once.

French Patent FR-2,525,565 describes a cap of this type.

In order to produce such a cap, it is known to use a three-part mould: a movable part or mould top matching the external shape of the cap without the tamperproof ring, a stripping part or stripper ring matching the external shape of the tamperproof ring and a fixed mould core matching the internal shape of the cap and of the tamperproof ring.

With such a mould, it is possible to remove the cap from the mould without unscrewing, by removing the movable part and the stripper ring away from the fixed core in a translational movement. On demoulding, the tabs are forced into a radial position pointing towards the inside of the tamperproof ring. This position is undesirable. The tabs are then turned up in such a way that they are almost parallel to the skirt and to the tamperproof ring, the tabs pointing towards the top of the cap. In order to bring the tabs into the desired position, the tamperproof ring and the cap which is fastened to it are moved closer to the core in such a way that the tabs are bent up towards the inside of the cap by the core of the mould.

During this operation of bending the tabs up, the assembly formed by the cap and the tamperproof ring is only held in place on the tamperproof ring by the stripper ring. This is because the part of the mould must be removed at the start of the demoulding operation in order to allow deformation of the cap when it is removed from the core in a translational movement. During the bending-up operation, it sometimes happens that the cap inclines, thus making it impossible for all the tabs to be bent up. This inclination is encouraged by a slight clearance which is formed between the stripper ring and the tamperproof ring during demoulding. This clearance is due to the contraction of the material of which the tamperproof ring is made as a result of it cooling.

The object of the invention is therefore to prevent the assembly formed by the cap and the tamperproof ring from inclining during the operation of bending up the tabs. It is hence a question of providing better retention of this assembly in the stripper ring.

For the purpose, the invention provides a mould and a cap intended to be produced in this mould.

The mould according to the invention is of the mould type for forming a cap having a cylindrical skirt, this skirt being provided with at least one screw thread and closed off at one end by a top, as well as a tamperproof ring linked to the free end of the skirt by breakable linking elements, the tamperproof ring including tabs intended to interact with an annular rib situated on the neck of a container intended to receive the cap, having a movable part or mould top, the internal wall of which corresponds to the external surface of the skirt and of the top, a stripping part or stripper ring, the inner surface of which corresponds to the external surface of the tamperproof ring, and a core, which is designed to be removed, by a translation movement but with no rotation, the external surface of the core corresponding to the internal surface of the top, of the skirt and of the tamperproof ring.

According to the invention, the stripper ring has, on the side facing the top of the mould, on the lower edge of the skirt and in at least two separate places, at least one notch and/or at least one projection so as to create a mortise-and-tenon linkage between the skirt and the stripper ring during moulding and demoulding of the cap.

In this way, perfect stability of the cap is ensured. This is because, during moulding, the material making up the cap matches the shape of the mould, especially the shape of the stripper ring, and when, after cooling, the material shrinks slightly, the mortise-and-tenon linkages remain and ensure excellent retention of the cap.

Advantageously, the stripper ring includes three notches or three projections distributed on the periphery of an upstand on which, in the closed position of the mould, the lower edge of the skirt bears. In this way, the cap is held in place at three points, guaranteeing good stability without there being a risk of the cap jamming.

With the core of the mould includes three grooves in order to form three threads in the skirt of the cap, each notch or projection is placed between the ends, situated on the side of the stripper ring, of two adjacent grooves in the core. In this way, when extracting the core from the cap, the projections or notches produced on the cap are subjected to a minimal stress.

Likewise, each notch or projection is placed between two adjacent recesses in the mould, these being provided in order to produce the breakable linking elements which link the tamperproof ring to the skirt, so as to be able to demould the cap without there being a risk of damaging it.

The cap according to the invention is of the type having a cylindrical skirt, this skirt being provided with at least one screw thread and closed off at one end by a top, as well as a tamperproof ring linked to the free end of the skirt by breakable linking elements, the tamperproof ring including tabs which, bent up towards the inside of the cap and pointing towards the top of the cap, are intended to interact with an annular rib situated on the neck of a container intended to receive the cap.

According to the invention, this cap furthermore has, on the lower edge of the skirt and in at least two separate places, at least one projection and/or at least one notch.

Advantageously, the projections and/or notches are situated on zones corresponding to 30% of the circumference of the cap, at the utmost, and preferably to approximately 10% of the circumference of the cap. Moreover, the heighth of the projections or notches is less than or equal to 0.6 mm, and is, preferably, approximately 0.5 mm.

Indeed, the point is to give the projections or notches such dimensions as to ensure a good retention of the cap, without, however, the cap being caught too strongly on the stripper ring, which would be the case if the projections or notches were too big.

This amounts to a cap which can be manufactured in a mould such as defined hereinabove.

Preferably, the lower edge of the skirt includes three projections or three notches distributed on its periphery.

Advantageously, when the skirt includes three threads on its internal face, each projection or notch is placed between the ends, situated on the side of the free edge of the skirt, of two threads.

By analogy with the characteristics of the mould, each projection or notch is placed between two adjacent breakable linking elements.

However, the invention will be more clearly understood with the aid of the description which follows, with reference to the appended diagrammatic drawing representing, by way of non-limiting example, two embodiments of a mould according to the invention, as well as a cap produced using one of these moulds.

Figure 4:
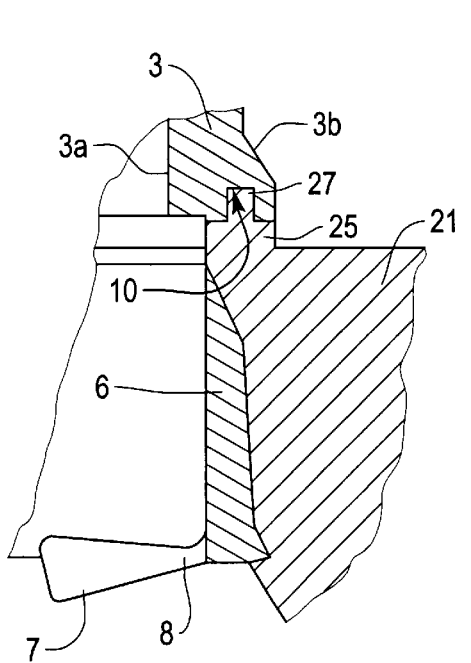
FIG. 4 is a view of the detail A in FIG. 1 on a larger scale.
Figure 5:
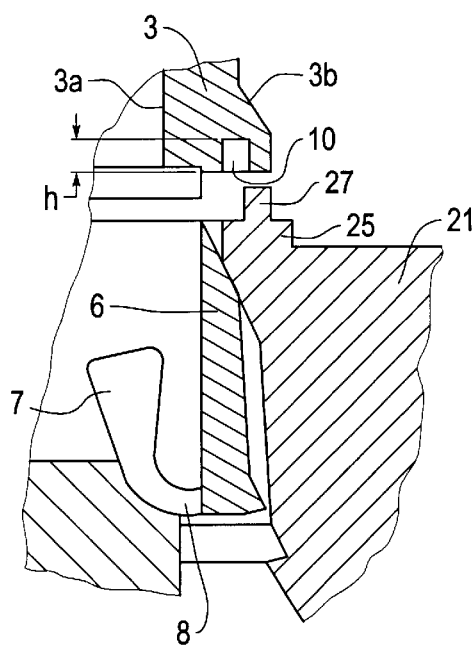
FIG. 5 is a view of the detail B in FIG. 3 on a larger scale.
Figure 9:
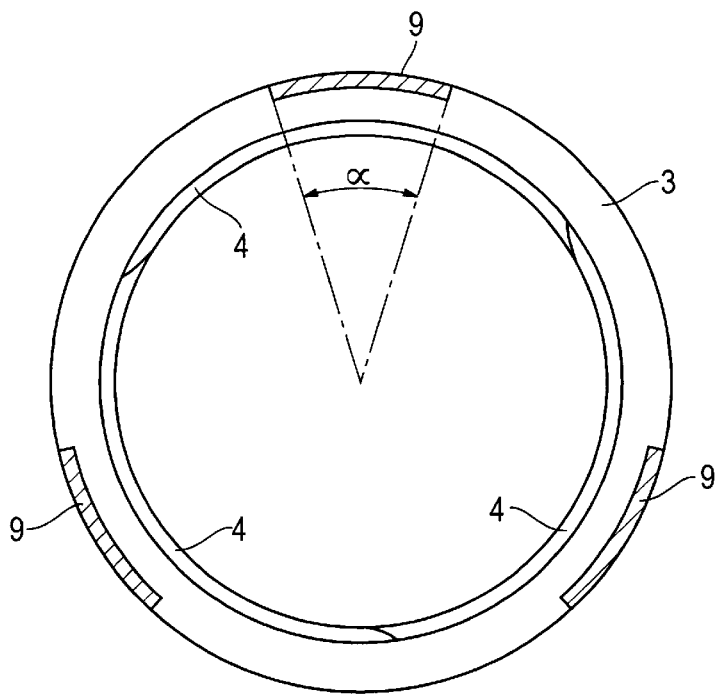

FIGS. 6 and 7 correspond to FIGS. 4 and 5 and show an alternative embodiment of the mould;

FIG. 8 represents, in perspective and on a larger scale, a cap according to the invention;

FIG. 9 is a bottom cross-section view of the cap shown in FIGS. 6–8.

Figure 10:
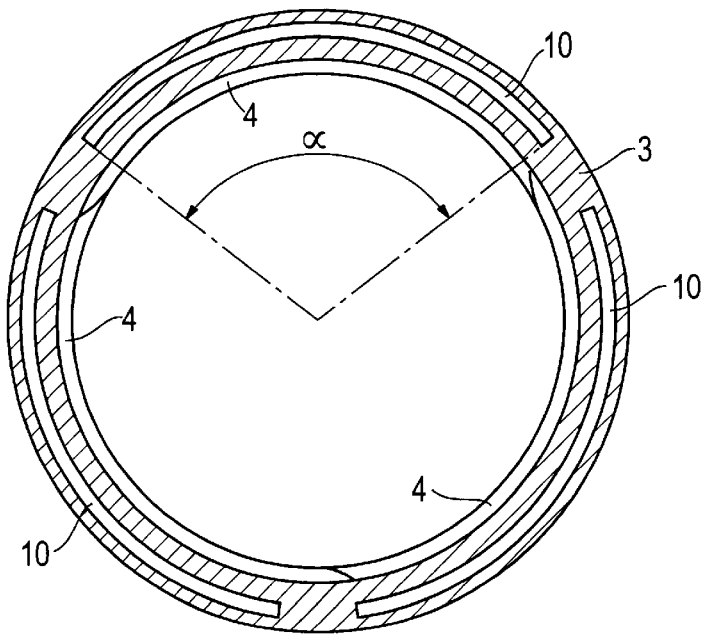

FIG. 10 is a bottom cross-section view of the cap shown in FIGS. 4 and 5.

FIGS. 1 to 3 and 8 to 10 show a cap 1 which has been produced in a mould according to the invention, as depicted in FIGS. 1 to 3 and FIGS. 6 and 7.

This cap 1 has, in a manner known per se, a top 2 extended by a skirt 3 having an interior side 3a and an exterior side 3b, and internal threading formed by three threads 4 along the interior side 3a of the skirt 3. The skirt 3 is linked, at its free end, by a plurality of linking elements 5, uniformly distributed on its periphery, to a tamperproof ring 6. These linking elements can be broken under a certain stress. This cap 1 is intended to equip a container, the neck of which includes threading having three external ribs, as well as an annular rib situated beneath the external threading.

The tamperproof ring 6 has several uniformly distributed tabs 7. The ring is linked to each tab by a thinned region of material 8 forming a film hinge, allowing the tab to be bent inwards. In FIGS. 5, 7 and 8, the tabs 7 are depicted in their final position, as they will be on the neck of the container. They are bent up towards the top 2 of the cap and are substantially parallel to the wall of the tamperproof ring 6 and to the skirt 3.

These tabs 7 are intended to interact with the annular rib on the neck of the container on unscrewing the cap 1 for the first time. During this first unscrewing, the tabs butt up against the annular rib before complete unscrewing, thus preventing the tamperproof ring from going beyond this rib. By continuing to exert an unscrewing torque on the skirt 3, the breakable linking elements 5 yield. The ring 6 then remains beneath the annular rib and the skirt 3 may be unscrewed, allowing access to the content of the container.

Furthermore, on the free edge of the skirt 3, facing the tamperproof ring 6, the cap includes three small-sized projections 9 (FIGS. 6 to 8). These projections 9 extend over a few millimeters and have a heighth of less than 0.6 millimeter. Each of these projections 9 is situated between two successive breakable linking elements 5. As indicated hereinabove, the threading 4 in the skirt includes three threads. The latter having a first end close to the top 2 of the cap and a second end close to the free edge of the skirt 3. There are consequently three ends of threads on the side of the free edge of the skirt. Each of the projections lies substantially halfway between two of these ends.

Figure 2:
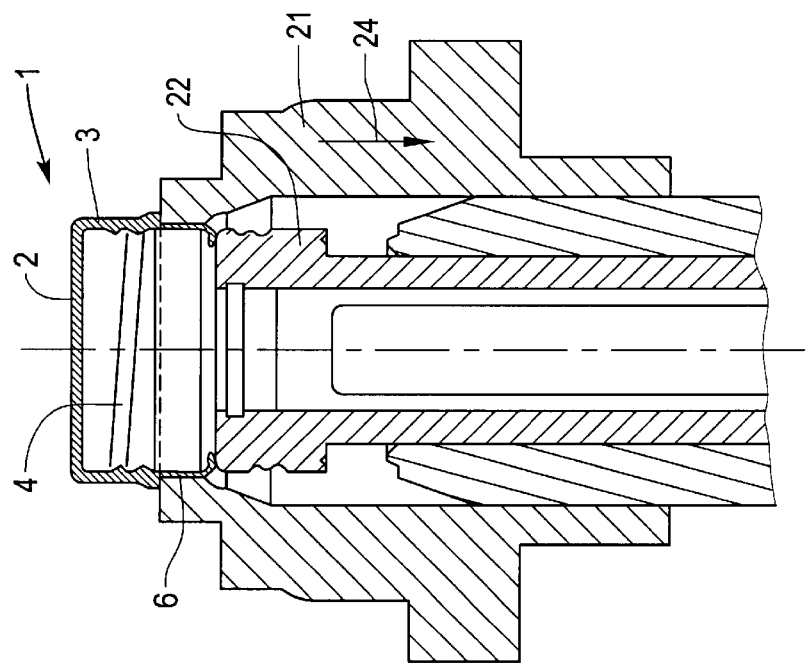
FIGS. 1 to 3 represent, in cross-section, a mould according to the invention during the various steps of demoulding.
Figure 1:
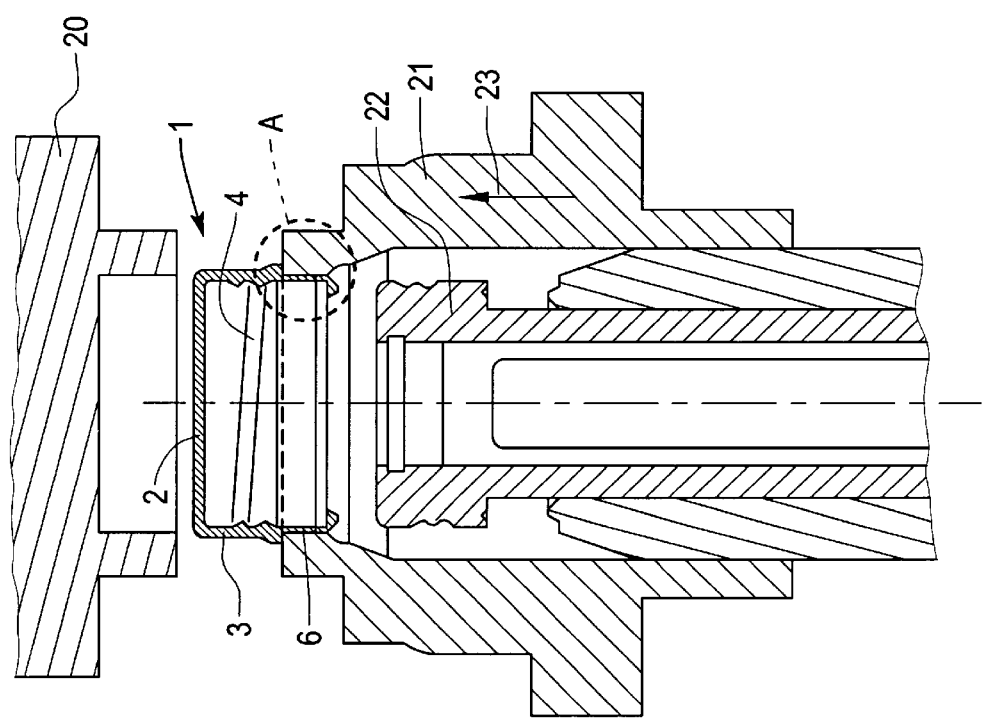
Figure 3:
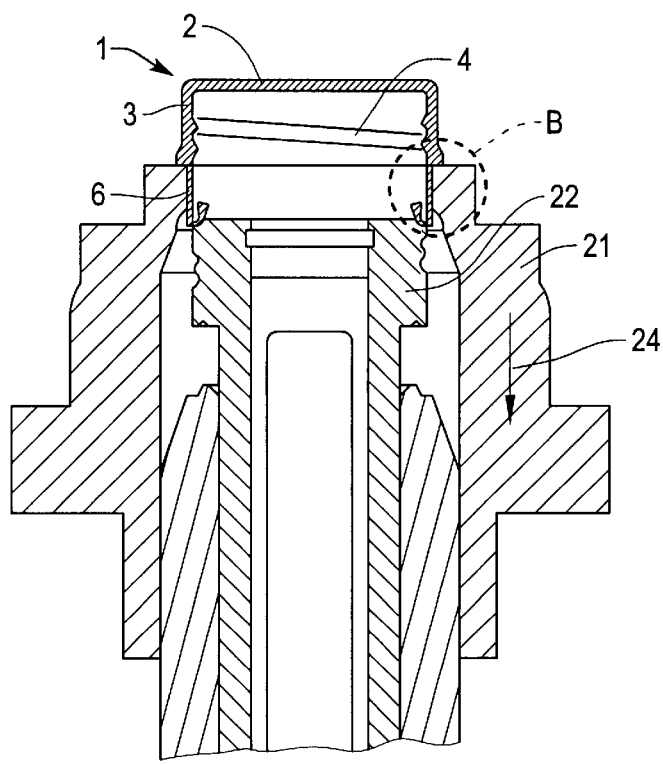

FIGS. 1 to 3 show, in cross-section, a mould for producing a cap such as the one described hereinabove. This mould includes three essential parts: a first part designated by the mould top or movable part 20, a second part called the stripping part or stripper ring 21 and a third part constituting the core 22 of the mould.

The internal surface of the top of the mould 20 corresponds to the external surface of the skirt 3 and of the top 2. The inner surface of the stripper ring corresponds to the external surface of the tamperproof ring 6. Finally, the core 22 imparts its shape to the internal surface of the cap, that is to say of the top 2, of the skirt 3 and the tamperproof ring 6.

In FIG. 1, the cap 1 has already been moulded and the mould is open. In order to open the mould, the movable part 20 is first of all removed. Next, the stripper ring 21 is moved in the direction of the arrow 23 in FIG. 1. The core 22 remains stationary.

The core 22 is removed in a process known per se by a translational movement of the stripper ring 21, without unscrewing. During this step, the skirt 3 deforms. It is in order to allow free deformation of the skirt 3 that the movable part 20 of the mould is removed before extracting the core. The tabs 7 of the tamperproof ring 6 are forced by the core 22 to adopt a substantially radial position, as depicted in FIGS. 4 and 6.

In order to bend the tabs 7 up and to bring them into a position in which they are substantially parallel to the skirt 3 and to the tamperproof ring 6 (FIGS. 5, 7 and 8), the stripper ring 21 is provided with a translational movement in the direction of the arrow 24 in FIGS. 2 and 3, in such a way that the tabs 7 move closer to the core 22. FIG. 2 illustrates the moment when the tabs 7 come into contact with the core 22 and FIGS. 3, 5 and 7 show the core 22 bending up the tabs 7 as well as the ejection of the cap from the mould.

FIGS. 6 and 7 show, on a larger scale, the details A and B in FIGS. 1 and 3 respectively. In these figures, the cutting plane passes through a projection 9 on the cap.

The stripper ring 21 includes an upstand 25 on which the free edge of the skirt 3 bears. This upstand 25 has a notch 26 in which a projection 9 is held. The stripper ring 21 includes three notches of this type. They are distributed on the periphery of the upstand 25. Each of these notches 26 lies between two adjacent breakable linking elements 5. In addition, these notches are, in each case, situated substantially halfway between two ends of a thread of the internal threading of the skirt, these ends being situated on the side of the free edge of the skirt.

In FIGS. 1 to 3, it may be seen that the cap is held in place only by the stripper ring 21. On bending up the tabs 7, in the absence of the projections 9 and the notches 26, the cap 1 may incline and consequently it is no longer possible to bend the tabs up. By virtue of the projections 9 and the notches 26, the cap 1 is stable and held in place perfectly. FIG. 9 is a bottom cross-section view of the cap shown in FIGS. 6–8 with the cutting plane passing through the projections 9.

An alternative embodiment is depicted in FIGS. 4 and 5. According to this alternative embodiment, the mortise-and-tenon linkage formed between the stripper ring 21 and the cap 1 is no longer produced by placing the tenon on the cap 1 and the mortise on the stripper ring 21, but by placing the tenon on the stripper ring and the mortise on the cap. The projections 9 are therefore each replaced by a notch 10 and the notches 26 are each replaced by a projection 27. FIG. 10 is bottom cross-section view of the cap shown in FIGS. 4–5 with the cutting plane passing through the skirt 3.

Of course, the invention is not limited to the embodiments described hereinabove by way of non-limiting examples but, on the contrary, embraces all variants thereof.

Thus, for example, the number of projections or of notches on the cap is not limited to three. There could be two or four of them thereon. A larger number is conceivable, but there is a risk of leading to problems such as the cap jamming in the mould during ejection from the mould or during extraction of the core.

It is also conceivable to have one or two notches and one or two projections on the cap.

The shape of the cap may be different. The top of the cap may, for example, have a skirt intended to go inside the neck of the container in order to perfect the sealing. The shape of the tabs may also be other than that depicted in the drawing.

In various exemplary embodiments of the invention, the projections 9 or the notches 10 are situated on zones corresponding to 30% of the circumference of the cap 1. In various other exemplary embodiments of the invention, the projections 9 or the notches 10 are situated on zones corresponding to approximately 10% of the circumference of the cap 1.

In various exemplary embodiments of the invention, the height of the projections 9 or the notches 10 is less than or equal to 0.6 mm. In various other exemplary embodiments of the invention, the height of the projections 9 or the notches 10 is approximately 0.5 mm.

What is claimed is:

1. A cap, comprising:
    a cylindrical skirt closed off at one end by a top and including at least one screw thread,
    a tamperproof ring linked to a free end of the skirt by at least one breakable linking element and including at least one tab which, when bent up towards an interior side of the cap and pointing towards a top of the cap, is intended to interface with an annular rib situated on a neck of a container intended to receive the cap; and
    on the free end of the skirt and in at least two separate places, at least one shape selected from the group consisting of projections and notches, which forms a cavity for creating a mortise-and-tenon linkage with a part including a complementary shape such as a mould stripper ring,
    each cavity is displaced radially inwardly of an exterior side of the free end of the skirt.

2. The cap according to claim 1, wherein the at least one shape is radially offset with respect to the at least one breakable linking element of the tamperproof ring.

3. The cap according to claim 1, wherein the at least one shape is on the exterior side of the lower edge of the skirt and the at least one breakable linking element of the tamperproof ring is situated on an interior side of the lower edge of the skirt.

4. The cap according to claim 1, wherein the at least one shape extends to at most 30% of the circumference of the cap.

5. The cap according to claim 1, wherein the at least one shape extends approximately 10% of the circumference of the cap.

6. The cap according to claim 1, wherein the height of the at least one shape is less than or equal to 0.6 mm.

7. The cap according to claim 1, wherein the height of the at least one shape is approximately 0.5 mm.

8. The cap according to claim 1, wherein the at least one shape is between two breakable linking elements.

9. The cap according to claim 1, wherein the skirt includes three threads on an interior side of the skirt and each of at least one shape is placed between the ends of two threads on the interior side of the free end of the skirt.

10. The cap according to claim 1 wherein a lower edge of the free end of the skirt includes three notches distributed around a periphery of the skirt.

11. The cap according to claim 1, wherein a width of the at least one shape is less than a width of the free end of the skirt.

12. The cap according to claim 11, wherein the at least one shape is a projection extending parallel to a longitudinal axis of the cap.

13. The cap according to claim 12, wherein a lower edge of the free end of the skirt includes three projections distributed around a periphery of the skirt.

14. A cap, comprising:
    a cylindrical skirt closed off at one end by a top and including at least one screw thread;
    a tamperproof ring linked to a lower edge of the skirt by at least one breakable linking element and including at least one tab which, when bent up towards the inside of the cap and pointing towards the top of the cap, is intended to interface with an annular rib situated on a neck of a container intended to receive the cap; and
    on the lower edge of the skirt and in at least two separate places, at least one shape consisting of a notch formed by a cavity which is open downwards and having a width less than a width of the lower edge of the skirt, so as to create a mortise-and-tenon linkage with a part including a complementary shape such as a mould stripper ring, the linkage strengthening the skirt against radial strain and dismountable by a movement parallel to a longitudinal axis of the cap.

15. The cap according to claim 14, wherein each at least one shape is placed between two breakable linking elements.

16. The cap according to claim 14, wherein the skirt includes three threads on an interior side of the skirt and each at least one shape is placed between the ends of two threads on one of the interior side or an exterior side of the lower edge of the skirt.

17. The cap according to claim 14 wherein the lower edge of the skirt includes three notches distributed around a periphery of the skirt.

18. A cap, comprising:
    a cylindrical skirt closed off at one end by a top and including at least one screw thread;
    a tamperproof ring linked to a lower edge of the skirt by at least one breakable linking element and including at least one tab which, when bent up towards the inside of the cap and pointing towards the top of the cap, is intended to interface with an annular rib situated on a neck of a container intended to receive the cap; and
    on the lower edge of the skirt and in at least two separate places, at least one shape consisting of a projection which extends from an external area of the lower edge and having a width less than a width of the lower edge of the skirt, so as to create a mortise-and-tenon linkage with a part including a complementary shape such as a mould stripper ring, the linkage strengthening the skirt against radial strain and dismountable by a movement parallel to a longitudinal axis of the cap.

19. The cap according to claim 18, wherein the at least one shape is a projection extending parallel to the longitudinal axis of the cap.

20. The cap according to claim 18, wherein the lower edge of the skirt includes three projections distributed around a periphery of the skirt.

21. The cap according to claim 18, wherein each at least one shape is placed between two breakable linking elements.

22. The cap according to claim 18, wherein the skirt includes three threads on an interior side of the skirt and each at least one shape is placed between the ends of two threads on one of the interior side and an exterior side of the lower edge of the skirt.

* * * * *